United States Patent
Moon et al.

(10) Patent No.: US 9,785,825 B2
(45) Date of Patent: Oct. 10, 2017

(54) METHOD FOR ESTIMATING DISPARITY SEARCH RANGE TO WHICH MULTI-LEVEL DISPARITY IMAGE DIVISION IS APPLIED, AND STEREO IMAGE MATCHING DEVICE USING THE SAME

(71) Applicant: KYUNGPOOK NATIONAL UNIVERSITY INDUSTRY—ACADEMIC COOPERATION FOUNDATION, Daegu (KR)

(72) Inventors: Byungin Moon, Daegu (KR); Taewoong Ahn, Daegu (KR); Kyeongryeol Bae, Daegu (KR)

(73) Assignee: KYUNGPOOK NATIONAL UNIVERSITY INDUSTRY—ACADEMIC COOPERATION FOUNDATION, Daegu (KR)

( * ) Notice: Subject to any disclaimer, the term of this patent is extended or adjusted under 35 U.S.C. 154(b) by 27 days.

(21) Appl. No.: 14/990,278

(22) Filed: Jan. 7, 2016

(65) Prior Publication Data

US 2017/0084014 A1 Mar. 23, 2017

(30) Foreign Application Priority Data

Sep. 21, 2015 (KR) ........................ 10-2015-0133106

(51) Int. Cl.
*G06K 9/00* (2006.01)
*G06T 7/33* (2017.01)

(52) U.S. Cl.
CPC .......... *G06K 9/00208* (2013.01); *G06T 7/337* (2017.01); *G06T 2207/10012* (2013.01);
(Continued)

(58) Field of Classification Search
CPC ................... G06T 7/002; G06T 7/0097; G06T 2207/20161; G06T 2207/20228; G06K 9/00208
See application file for complete search history.

(56) References Cited

U.S. PATENT DOCUMENTS

| | | | |
|---|---|---|---|
| 2011/0158528 A1* | 6/2011 | Yea | ........................ G06T 7/593 382/170 |
| 2013/0113881 A1* | 5/2013 | Barnum | ............. H04N 13/0018 348/43 |
| 2013/0136339 A1* | 5/2013 | Moon | ....................... G06K 9/62 382/154 |

FOREIGN PATENT DOCUMENTS

| | | | | |
|---|---|---|---|---|
| EP | 2 860 695 | * | 4/2015 | ............... G06T 5/00 |
| KR | 101220003 | * | 1/2013 | ......... H04N 13/0271 |

(Continued)

*Primary Examiner* — Amara Abdi
(74) *Attorney, Agent, or Firm* — Porzio Bormberg & Newman P.C.

(57) ABSTRACT

Provided is a method for estimating a disparity search range to which multi-level disparity image partition is applied, and a stereo image matching device using the same in that a disparity histogram of a previous disparity image is analyzed at the time of stereo matching of a continuous image, the disparity image is divided into various sizes of image blocks, and a disparity search range is estimated on the basis of a disparity value having the number of pixels equal to or more than a predetermined threshold value for each image block, thereby decreasing a calculation amount while improving a stereo matching rate of the next frame.

13 Claims, 6 Drawing Sheets

(52) U.S. Cl.
　　　CPC ............... *G06T 2207/20016* (2013.01); *G06T 2207/20021* (2013.01)

(56)　　　　　　References Cited

FOREIGN PATENT DOCUMENTS

| KR | 20130067466 | * | 6/2013 | ............. H04N 13/00 |
| KR | 101505360 | * | 3/2015 | ............... G06T 7/00 |

\* cited by examiner

REFERENCE IMAGE

COMPARATIVE IMAGE

REFERENCE IMAGE

COMPARATIVE IMAGE

DISPARITY HISTOGRAM

METHOD FOR ESTIMATING DISPARITY SEARCH RANGE TO WHICH MULTI-LEVEL DISPARITY IMAGE DIVISION IS APPLIED, AND STEREO IMAGE MATCHING DEVICE USING THE SAME

BACKGROUND

The present invention relates to a method for estimating a disparity search range to which multi-level disparity image partition is applied, and a stereo image matching device in that a disparity histogram of a previous disparity image is analyzed at the time of stereo matching of a continuous image, the disparity image is divided into various sizes of image blocks, and a disparity search range is estimated on the basis of a disparity value having the number of pixels equal to or more than a predetermined threshold value for each image block, thereby decreasing a calculation amount while improving a stereo matching rate of the next frame.

Stereo matching is a technique of preparing two cameras different from each other at different positions, and obtaining 3-dimensional information from images obtained by imaging the same position at the same time. In this case, in the stereo matching, matching points corresponding to the same point in a reference image and a comparative image are found, and disparity information between two matching points is calculated, thereby obtaining a disparity image that is 3-dimensional distance information.

As stereo matching methods, there are feature-based matching and area-based matching.

The feature-based matching method is a method of finding feature points in the entire image, and performing matching of the feature points. In this case, the calculation speed is high, but the accuracy is low.

Meanwhile, in the area-based matching method, matching is performed for the entire image, thus a calculation speed is low, but accuracy is high.

In the area-based matching method, in order to supplement the disadvantage of a low calculation speed, a range to compare a correlation is designated when performing the stereo matching to decrease a calculation amount of the area-based matching method to decrease a calculation time. In this case, the designated range to compare a correlation is referred to as a disparity search range.

FIG. 1A and FIG. 1B are diagrams for explaining a procedure of performing a stereo matching process.

In FIG. 1A and FIG. 1B, assuming that a point of a comparative image having the coordinate value as that of a point P of a reference image is Q, a point corresponding to the point P is searched in a disparity search range (Z) having a predetermined size based on Q. In this case, a point having the highest correlation with the point P is referred to as P', and a disparity D that is a distance difference between P' and Q is calculated, thereby obtaining a disparity image that is 3-dimensional distance information.

The stereo matching method described above, a correlation between one point of a reference image and points in a disparity search range set to a predetermined size in a comparative image is calculated one by one to acquire a disparity, and thus a calculation amount of stereo matching is increased in proportion to a disparity search range.

Due to the reason, at the time of stereo matching of a continuous image, assuming that change in image between adjacent frames is not large, when the stereo matching is performed only in the range of the disparity extracted from the stereo matching of the previous frame, it is possible to reduce a calculation amount of stereo matching. In addition, when using a method of performing stereo matching in a disparity range of the previous frame in each of image blocks generated after dividing a disparity image into a fixed size, it is possible to further reduce a calculation amount of stereo matching.

However, in the method of estimating a fixed-division disparity search range described above, when the number of divided image blocks for a disparity image is set to be large considering a calculation amount, and when there is a lot of noises in an image block corresponding to a disparity search range or there is only a small size of object or a part of the object in an image block, it is determined as a noise component and is removed, and thus an error may occur in acquiring disparity information. Eventually, this is a factor of lowering accuracy of stereo matching.

SUMMARY OF THE INVENTION

The invention has been made in consideration of the circumstances described above, and a technical object of the present invention is to provide a method for estimating a disparity search range to which multi-level disparity image partition is applied, and a stereo image matching device in that a disparity histogram of a previous disparity image is analyzed at the time of stereo matching of a continuous image, the disparity image is divided into various sizes of image blocks, and a disparity search range is estimated on the basis of a disparity value having the number of pixels equal to or more than a predetermined threshold value for each image block, so that it decreases a calculation amount and improves a stereo matching rate of the next frame, thereby rapidly processing the operation thereof.

According to an aspect of the invention to achieve the object described above, there is provided a stereo image matching device including: a left camera and a right camera which take images of the same position at the same time to provide a stereo image; a stereo matching unit which performs a matching process based on a correlation for an image block on the basis of a disparity search range for each image block estimated and divided for the previous disparity image in two images provided from the left camera and the right camera, and outputs a disparity image for the current stereo image; and a disparity search range estimating unit which generates a disparity histogram configured with the number of pixels for each disparity value with respect to the disparity image output from the stereo matching unit, divides the disparity image into multi-level blocks on the basis of the number of valid disparity values obtained by masking valid disparity values having the number of pixels equal to or more than a threshold value in the disparity histogram, estimates a disparity search range to include a valid disparity value for each divided image block, and provides the disparity search range to the stereo matching unit.

Preferably, the disparity search range estimating unit includes: a disparity histogram generating module which generates a disparity histogram configured with the number of pixels for each disparity with respect to an input image; a threshold value calculating module which calculates a threshold value to have a smaller value as the number of division times is increased for the image block; an image blocking module which masks valid disparity values equal to or more than the threshold value in the image block, divides the image block when the number of masked valid disparity values is equal to or more than a predetermined ratio of the maximum disparity search value, and performs a blocking process; and a disparity search range estimating module which estimates a disparity search range for each image block on the basis of pixel information corresponding to the valid disparity value for each image block divided in multi-level for one disparity image.

Preferably, the disparity search range estimating unit additionally calculates a valid disparity value by comparing a preset threshold value with the number of pixels calculated by applying a disparity value to a stretch function, and estimates a disparity search range including the additionally calculated valid disparity value and the masked valid disparity values for the image block, $$y = \left(\frac{x-a}{b-a}\right)^{\gamma}(d-c)+c$$

where γ denotes a constant set by a user, x denotes a disparity value, y denotes the number of pixels with a disparity of x, a denotes an x axis minimum value of a stretch function generated by γ, b denotes an x axis maximum value of a function generated by γ, c denotes a y axis minimum value of a stretch function generated by γ, and d denotes a y axis maximum value of a stretch function generated by γ.

Preferably, the disparity search range estimating unit primarily calculates a valid disparity value using a stretch function for the first γ set by a user, calculates the second γ having an average value of "1" with the first γ, secondarily calculates a valid disparity value using a stretch function for the second γ, and estimates a disparity search range including the valid disparity value for the first γ and the valid disparity value for the second γ.

Preferably, the threshold value calculating module calculates a threshold value for the image block using the following equation, $$\text{threshold} = \frac{\max(\text{hist}) \times \alpha}{\beta}$$

where max(hist) denotes the maximum number of pixels of the number of pixels corresponding to a disparity value, α denotes a threshold value ratio in the range of 0<α<1, and β denotes the number of divided image blocks (the number of current division times).

According to another aspect of the invention to achieve the object described above, there is provided a method for estimating a disparity search range, to which multi-level disparity image division is applied, to be applied left and right image matching for the next frame using a matching-processed disparity image for left and right images provided from a left camera and a right camera, including: a first step of analyzing a disparity image for left and right images and generating a disparity histogram configured with the number of pixels for each disparity value; a second step of masking valid disparity values having the number of pixels equal to or more than a threshold value in the disparity histogram; a third step of performing a blocking process of dividing an image block when the number of masked valid disparity values is equal to or more than a predetermined ratio of a maximum disparity value; a fourth step of generating a disparity histogram for each image block divided in the third step, masking valid disparity values having the number of pixels equal to or more than a threshold value, and repeatedly performing the third step on the basis of the number of masked valid disparity values; and a fifth step of generating, when the number of masked valid disparity values is less than a predetermined ratio of a maximum disparity search value in the third step, a disparity search range for each image block to include the valid disparity values for each image block divided for the disparity image.

Preferably, the second step includes a step of calculating a threshold value to have a smaller value as the number of division times is increased.

Preferably, the step of calculating the threshold value calculates a threshold value for the image block using the following equation, $$\text{threshold} = \frac{\max(\text{hist}) \times \alpha}{\beta}$$

where max(hist) denotes the maximum number of pixels of the number of pixels corresponding to a disparity value, α denotes a threshold value ratio in the range of 0<α<1, and β denotes the number of divided image blocks (the number of current division times).

Preferably, the corresponding image block divides into the preset number of divided image blocks in the third step, when the number of masked valid disparity values is equal to or more than a value of dividing the maximum disparity value by the preset number of divided image blocks.

Preferably, in the third step, the corresponding image block is divided into four image blocks to be blocked.

Preferably, in the third step, it compares the current number of division times with the preset maximum number of division times and the blocking process for the image blocking is ended when the current number of division times is equal to or more than the maximum number of division times.

Preferably, in the fifth step, it calculates a valid disparity value by comparing a preset threshold value with the number of pixels calculated by applying a disparity value to a stretch function, and estimates a disparity search range including the additionally calculated valid disparity value and the masked valid disparity values for the image block, $$y = \left(\frac{x-a}{b-a}\right)^{\gamma}(d-c)+c$$

where γ denotes a constant set by a user, x denotes a disparity value, y denotes the number of pixels with a disparity of x, a denotes an x axis minimum value of a stretch function generated by γ, b denotes an x axis maximum value of a function generated by γ, c denotes a y axis minimum value of a stretch function generated by γ, and d denotes a y axis maximum value of a stretch function generated by γ.

Preferably, in the fifth step, it additionally generates a disparity histogram for the image block based on the number of pixels calculated by applying a disparity value to the stretch function and additionally calculates disparity values having the number of pixels equal to or more than a preset threshold value as a valid disparity value for the additionally generated disparity histogram.

Preferably, in the fifth step, it primarily calculates a valid disparity value using a stretch function for the first γ set by a user, calculates the second γ having an average value of "1" with the first γ, secondarily calculates a valid disparity value using a stretch function for the second γ, and estimates a disparity search range including the valid disparity value for the first γ and the valid disparity value for the second γ.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Hereinafter, a method for estimating a disparity search range to which multi-level disparity image division is applied and a stereo image matching device using the same will be described with reference to the accompanying drawings.

Figure 1A:
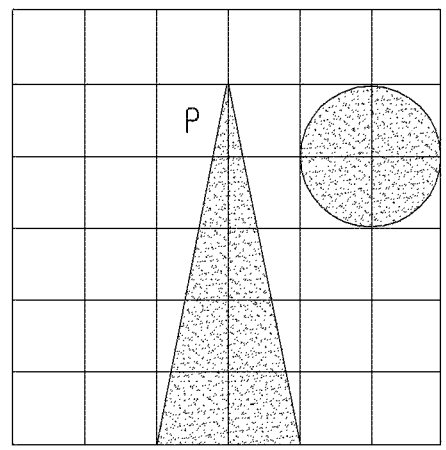
FIG. 1A and FIG. 1B are diagrams for explaining a procedure of performing a stereo matching process.
Figure 1B:
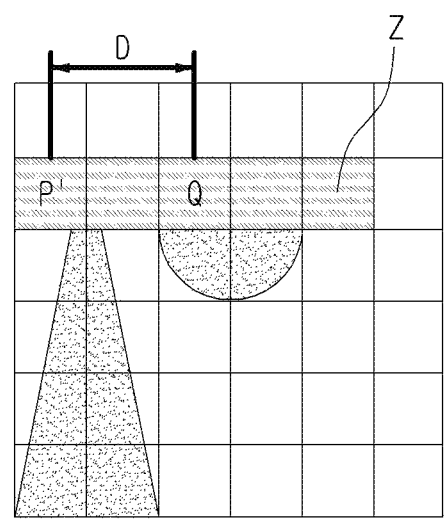
Figure 2:
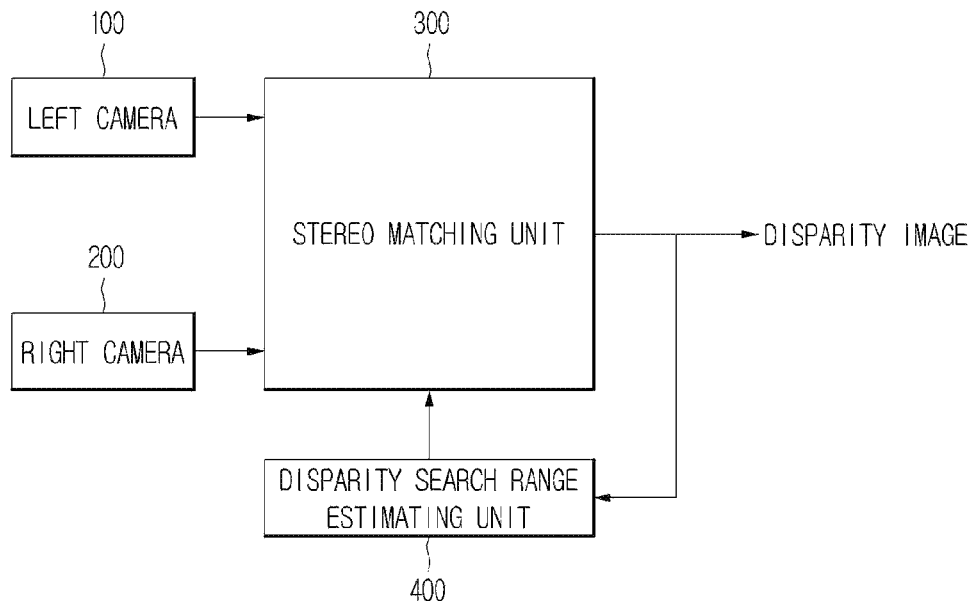
FIG. 2 is a schematic block diagram illustrating a stereo image matching device according to the present invention.

As illustrated in FIG. 2, a stereo image matching device includes left and right cameras 100 and 200 which take images of the same position at the same time to provide a stereo image, a stereo matching unit 300, and a disparity search range estimating unit 400.

The left camera 100 and the right camera 200 are disposed at a predetermined distance, and take a stereo image of the same position.

The stereo matching unit 300 performs an area-based matching, that is, a matching process based on a correlation on the basis of the disparity search range estimated for the previous disparity image of two images provided from the left camera 100 and the right camera 200, and outputs the disparity image for the stereo image. In this case, the stereo matching unit 300 performs a matching process for the current image on the basis of a disparity search range for each multi-level division image block provided from the disparity search range estimating unit 400.

The disparity search range estimating unit 400 generates a disparity histogram configured with the number of pixels for each disparity value with respect to the disparity image output from the stereo matching unit 300, divides the disparity image into multi-level image blocks on the basis of a valid disparity value having the number of pixels equal to or more than a threshold value in the disparity histogram, estimates a disparity search range for each image block, and provides the disparity search range to the stereo matching unit 300.

Meanwhile, in estimating the disparity search range on the basis of a threshold value for each image block in the disparity search range estimating unit 400, the disparity search range is gradually decreased as a continuous frame is gradually increased. This is a cause of lowering accuracy of the stereo matching process in the stereo matching unit 300.

Accordingly, the disparity search range estimating unit 400 additionally sets a valid disparity value for each image block considering such a situation to estimate the disparity search range. In this case, the disparity search range estimating unit 400 compares the number of pixels calculated by applying a disparity value to a stretch function with a preset threshold value, to additionally calculate a valid disparity value.

Figure 3:
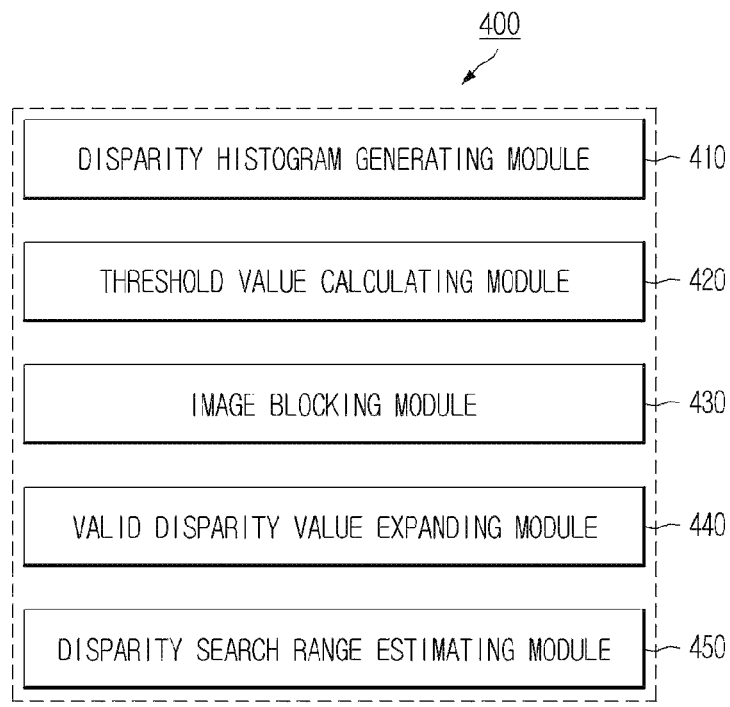
FIG. 3 is a functional block diagram illustrating an internal configuration of the disparity search range estimating unit shown in FIG. 2.

FIG. 3 is a functional block diagram illustrating an internal configuration of the disparity search range estimating unit 400.

As illustrated in FIG. 3, the disparity search range estimating unit 400 includes a disparity histogram generating module 410, a threshold value calculating module 420, an image blocking module 430, a valid disparity value expanding module 440, and a disparity search range estimating module 450.

Figure 4A:
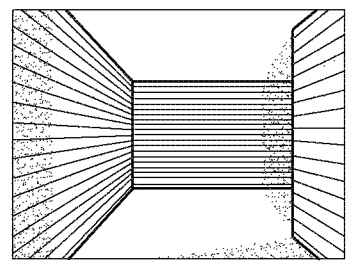
FIG. 4A through FIG. 4C illustrate reference images taken by the left camera, a comparative image taken by the right camera, and a disparity histogram for a matching-processed disparity image for the reference image and the comparative image.
Figure 4B:
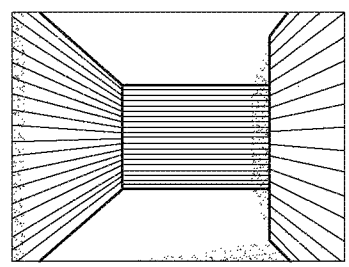
Figure 4C:
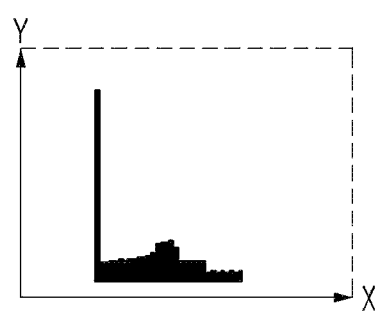

The disparity histogram generating module 410 generates a disparity histogram configured with the number of pixels for each disparity value with respect to an input image. In this case, the disparity histogram generating module 410 first generates a histogram for a disparity image provided from the stereo matching unit 100, that is, an image configured with one image block, and then generates a disparity histogram for each image block divided through the image blocking module 430 with respect to the disparity image. FIG. 4A through FIG. 4C illustrate reference images taken by the left camera 100, a comparative image taken by the right camera 200, and a disparity histogram for a matching-processed disparity image for the reference image and the comparative image respectively. In FIG. 4A through FIG. 4C, an X axis of the disparity histogram denotes a disparity value, and a Y axis denotes the number of pixels. In this case, the maximum disparity value may be predetermined by a user. For example, a disparity value of the disparity histogram is in the range of "0 to 64", and the maximum disparity value may be set to "32" by a user.

The threshold value calculating module 420 generates a threshold value for the entire image block of the disparity image or each image block divided in multi-level. The threshold value is a valid disparity value determination criterion for optimizing a disparity search range by removing an error component from the image block. Generally, since high pixel distribution is represented with respect to a specific disparity value of a disparity histogram of an image in which an object exists, it is considered that a disparity value having a value smaller than a predetermined value may be determined as an error component caused by noise or the like.

In addition, the threshold value calculating module 420 generates a threshold value for the disparity histogram by a method of Equation 1.

$$\text{threshold} = \frac{\max(\text{hist}) \times \alpha}{\beta} \quad \text{[Equation 1]}$$

Herein, max(hist) denotes the maximum number of pixels corresponding to the most numerous number of pixels in the number of pixels corresponding to the disparity value in the disparity histogram, α denotes a threshold value ratio and is set to a value of 0<α<1, and β denotes the number of divided image blocks (the number of current division times). In this case, the α is a value set by a user and is a parameter representing a percentage of the maximum disparity value to be set as a threshold value, and β is a parameter of setting the threshold value to be lower as the size of the image block gets smaller since a value thereof gets larger as the image block gets smaller.

The image blocking module 430 determines whether to divide the image block on the basis of the threshold value generated in the threshold value calculating module 420 and divides, when a preset division condition is satisfied, the image block divides into the preset number of divided image blocks to be multi-level image blocks. Herein, the image blocking module 430 extracts valid disparity values equal to or more than a threshold value by masking in the current image block, and determines whether to divide the current image block on the basis of whether or not the number of masked valid disparity values and the current number of division times are equal to or more than a preset reference value. In other words, the image blocking module 430 divides the disparity image provided from the stereo matching unit 300 into multi-level image blocks, and detailed description thereof will be described hereinafter with reference to the following flow chart.

The valid disparity value expanding module 440 expands the valid disparity value using a stretch function. In this case, the stretch function is as Equation 2.

$$y = \left(\frac{x-a}{b-a}\right)^\gamma (d-c) + c \quad \text{[Equation 2]}$$

Herein, γ denotes a constant set by a user, x denotes a disparity value, y denotes the number of pixels in which a disparity is x, a denotes an axis minimum value of a stretch function generated by γ, c denotes a y axis minimum value of a stretch function generated by γ, and d denotes a y axis maximum value of a stretch function generated by γ. In other words, the valid disparity value expanding module 440 calculates a valid disparity value in which the number y of pixels calculated again with respect to the disparity value x in Equation 2 is equal to or more than a threshold value. In this case, the valid disparity value expanding module 440 newly generates a disparity histogram on the basis of the number of pixels calculated by Equation 2, and additionally calculates a disparity value having the number of pixels equal to or more than a preset threshold value with respect to the newly calculated disparity histogram, as a valid disparity value, to extract the valid disparity value.

Figure 5A:
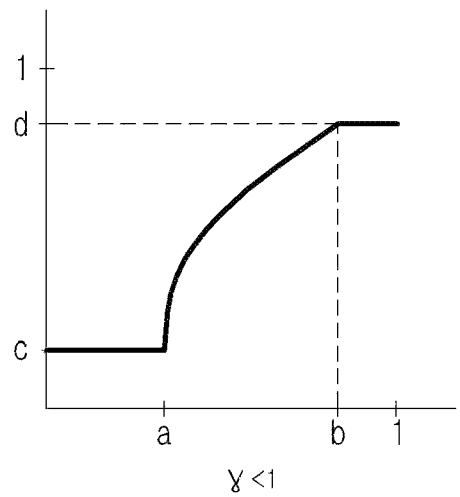
FIG. 5A and FIG. 5B are diagrams illustrating an example of a characteristic graph of a stretch function generated according to a range of γ used in a valid disparity value expanding module shown in FIG. 3.
Figure 5B:
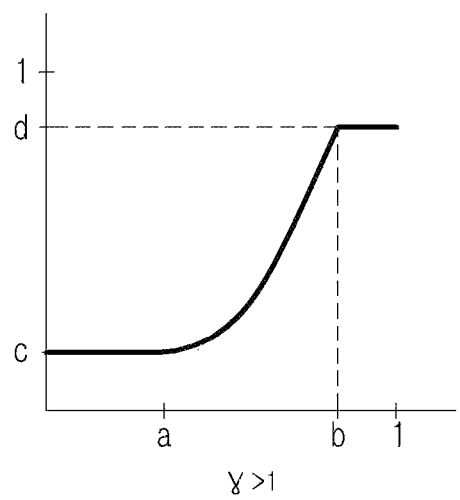

FIG. 5A and FIG. 5B are diagrams illustrating an example of a characteristic graph of a function generated according to a range of γ. In other words, it can be known that the stretch function represents graph characteristics different from each other when the γ value is larger than and smaller than "1" based on "1".

In addition, the valid disparity value expanding module 440 performs a valid disparity value expanding process twice according to the γ value, in applying masking information for each image block to the stretch function. In other words, the valid disparity value expanding module 440 sets the first γ value in the range of 0<first γ<1, and sets the second γ value to a value having an average value of "1" with the first γ value, to additionally estimates a valid disparity value. For example, the valid disparity value expanding module 440 estimates a valid disparity value when the first γ value is "0.8" by Equation 2, and then estimates a valid disparity value when the second γ value is "1.2".

The disparity search range estimating module 450 estimates a disparity search range for each image block on the basis of valid disparity value information extracted in the image blocking module 430 for each image block and valid disparity value information additionally estimated in the valid disparity value expanding module 440. For example, when the valid disparity values extracted in the image blocking module 430 are "2, 4, 5, 6" and the valid disparity values additionally estimated in the valid disparity value expanding module 440 are "1, 3, 4, 5," and "3, 5, 6, 7", the disparity search range estimating module 450 sets a disparity value area of "1, 2, 3, 4, 5, 6, 7" including all the valid disparity values in the image block, to a disparity search range for the image block.

Figure 6:
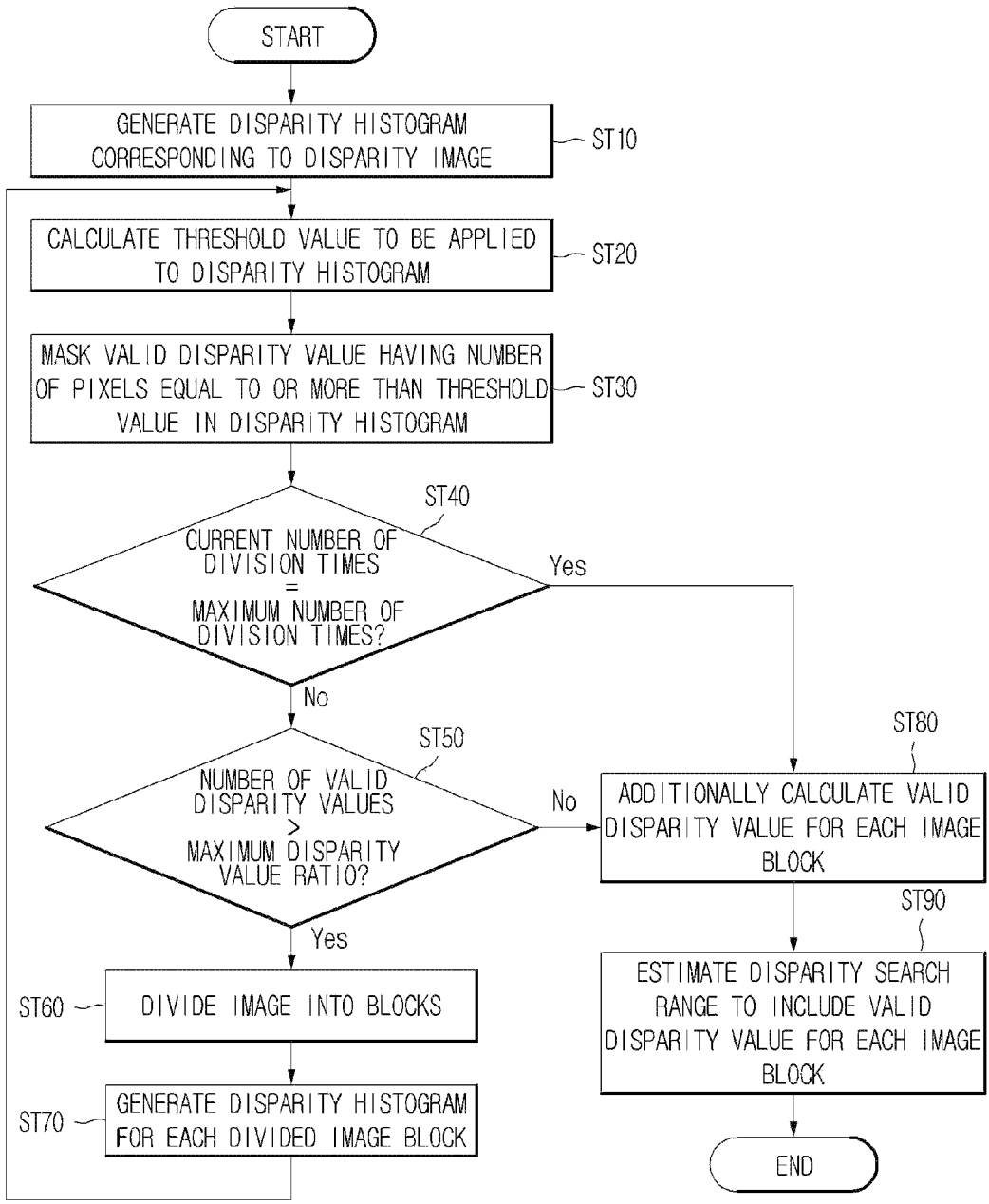
FIG. 6 is a flowchart illustrating a method for estimating a disparity search range, to which multi-level disparity image division is applied, according to the present invention.

Subsequently, a method for estimating a disparity search range to which multi-level disparity image division is applied will be described with reference to a flowchart illustrated in FIG. 6.

First, the stereo matching unit 300 performs a matching process on the basis of a disparity search range estimated for the previous disparity image with respect to the left and right images provided from the left camera 100 and the right camera 200. In addition, the stereo matching unit 300 generates and outputs a disparity image by matching process with respect to the current image.

The disparity search range estimating unit 400 generates a disparity histogram on the basis of the disparity image provided from the stereo matching unit 300 (ST10). As illustrated in FIG. 4, in the disparity histogram, an X axis denotes a disparity value, and a Y axis denotes the number of pixels. In this case, pixel information corresponding to the disparity value is stored in a memory (not illustrated).

Subsequently, the disparity search range estimating unit 400 calculates a threshold value for the image on the basis of the disparity histogram (ST20). In this case, the threshold value is calculated to be a smaller value as the number of current division times gets larger. In other words, as compared with a first threshold value set for one image frame, a second threshold value calculated for a predetermined division area of the next image frame, that is, a smaller image block is set to be smaller than the first threshold value. For example, in the disparity search range estimating unit 400, in a state where the maximum number of pixels is "32", a threshold value ratio is "0.5", and the number of divided image blocks is "4", and when the current number of division times is "1", a first threshold value of "4" is calculated by Equation 1, and when the current number of division times is "2", a second threshold value of "1" is calculated by Equation 1.

Figure 7A:
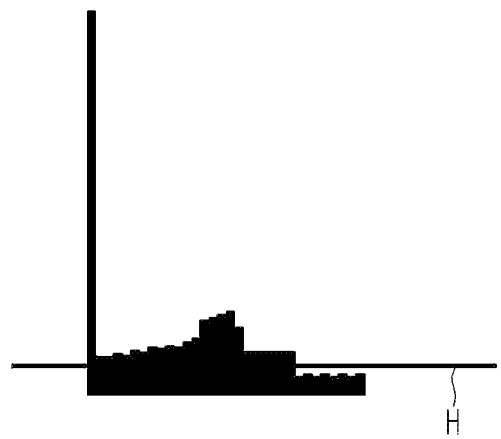
FIG. 7A and FIG. 7B are diagrams illustrating an example of a multi-level division block state for a disparity image of FIG. 6.

The disparity search range estimating unit 400 compares the disparity histogram for the image with the threshold value calculated in Step ST20, thereby masking valid disparity values having the number of pixels equal to or more than the threshold value (ST30). For example, in a disparity histogram illustrated in FIG. 7A, the valid disparity values having the number of pixels equal to or more than a threshold value (H) may be "1, 2, 3, 4, . . . , 15, 16".

Subsequently, the disparity search range estimating unit 400 compares the current number of division times with the preset maximum number of division times, and determines whether the current number of division times is equal to the maximum number of division times (ST40).

When the current number of division times is not equal to the preset maximum number of division times in Step ST40, more specifically, is less than the maximum number of division times, the disparity search range estimating unit 400 determines whether or not the number of valid disparity values masked in Step ST30 is equal to or more than a predetermined ratio of the preset maximum disparity value (ST50). For example, when the maximum disparity value is "32" and the number of divided image blocks is "4", the disparity search range estimating unit 400 determines whether or not the current number of masked valid disparity values of "16" is equal to or more than the maximum disparity value/the number of divisions, that is, 32/4="8".

When the number of valid disparity values masked in ST50 is equal to or more than the predetermined ratio of the preset maximum disparity value, the disparity search range estimating unit 400 divides the current image block into blocks of the preset number of divisions (ST60). For example, when the number of divided image blocks is "4", the current image block is divided into four image blocks. In this case, the disparity search range estimating unit 400 counts the number of division times for the current disparity image, and stores it in a memory.

Figure 7B:
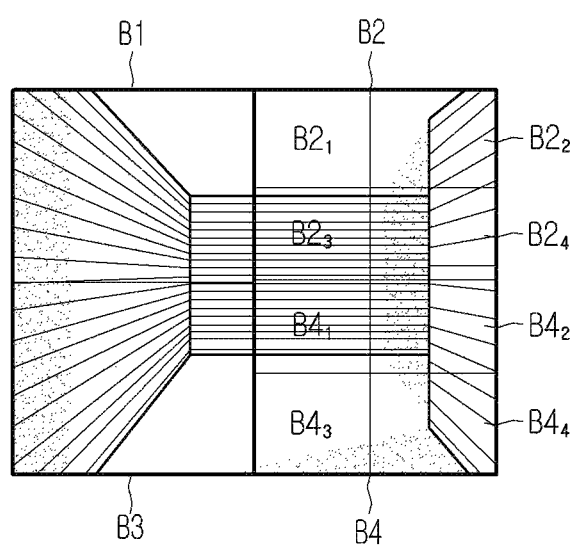

Thereafter, when the conditions of ST40 and ST50 are satisfied for each image block divided into four image blocks, the disparity search range estimating unit 400 divides the image block again into four image blocks. In other words, one disparity image is divided into multi-level image blocks according to the division condition. FIG. 7B is a diagram illustrating an example of a multi-level division block state for a disparity image. FIG. 7B illustrates that one disparity image is divided once into first to fourth image blocks B1, B2, B3, and B4, and then the second image block B2 and the fourth image block B4 are divided again twice into 21st to 24th image blocks $B2_1$, $B2_2$, $B2_3$, and $B2_4$ and 41st to 44th image blocks $B4_1$, $B4_2$, $B4_3$, and $B4_4$, respectively.

Subsequently, the disparity search range estimating unit 400 generates a disparity histogram for each image block of the blocks divided in ST50 (ST70).

In addition, the disparity search range estimating unit 400 performs a series of processes of generating a threshold value on the basis of the disparity histogram for the divided image blocks, masking valid disparity values equal to or more than the threshold value, determining whether to divide on the basis of the number of masked valid disparity values, and performing a block process on the image blocks according to the division determination result. In this case, pixel information for the masked valid disparity value for each image block is stored in a memory (not illustrated).

Meanwhile, when the current number of division times is equal to or more than the preset maximum number of division times in Step ST30 or when the number of valid disparity values of all the image blocks for the disparity image is less than the maximum disparity value ratio in Step ST40, the disparity search range estimating unit 400 ends the block process for the image block.

Subsequently, the disparity search range estimating unit 400 calculates an additional valid disparity value for the image block using a stretch function (ST80). In this case, the disparity search range estimating unit 400 additionally calculates a valid disparity value in which the number of pixels calculated by applying a disparity value to a stretch function is equal to or more than a predetermined threshold value, and the valid disparity value additional calculating process is performed twice using Equation 2 on the basis of a γ value set by a user. For example, the valid disparity value expanding module 440 additionally estimates valid disparity values "1, 3, 4, 5" by Equation 2 in the case of the first γ value "0.8" with respect to valid disparity values "2, 4, 5, 6", and additionally estimates valid disparity values "3, 5, 6, 7" in the case of the second γ value "1.2".

Thereafter, the disparity search range estimating unit 400 estimates a disparity search range for each image block to include the valid disparity values additionally calculated through the stretch function and the valid disparity values extracted on the basis of the threshold value for each image block constituting one disparity image (ST90).

The disparity search range estimating unit 400 provides all the disparity search range information for each image block estimated in Step ST90, to the stereo matching unit 300 to be applied as a disparity search range for the next frame.

In other words, according to the embodiment, the disparity image is divided into multi-level image blocks according to the preset division condition, the disparity histogram for each divided image block is analyzed, the valid disparity values are extracted on the basis of the threshold value for each image block, and the valid disparity values are additionally calculated for each image block using the stretch function. An image area corresponding to disparity values included in masking information and masking expansion information for each image block is estimated as a disparity search range for the disparity image.

In addition, according to the embodiment, the stereo matching process for the current frame is performed using the disparity search range information calculated through the multi-level disparity image division for the previous disparity image, and thus it is possible to more rapidly and accurately perform the stereo matching process.

According to the invention, the disparity image is divided into the image blocks in multi-level with a variable size and the adaptive disparity search range for each image block is estimated on the basis of the predetermined threshold value calculated according to each image block, thereby decreasing a calculation amount while improving a stereo matching rate of the next frame.

According to the invention, in estimating an adaptive disparity search range for each image block by dividing a disparity image in multi-level with a variable size, a disparity search range is estimated with a margin to additionally include a valid disparity value calculated through a stretch function for each image block, thereby solving a problem of decrease in stereo matching accuracy which may occur since a disparity search range for a continuous disparity image is gradually decreased.

While the present invention has been described with respect to the specific embodiments, it will be apparent to those skilled in the art that various changes and modifications may be made without departing from the spirit and scope of the invention as defined in the following claims.

What is claimed is:

1. A stereo image matching device comprising:
a left camera and a right camera which take images of the same position at the same time to provide a stereo image;
circuitry, comprising module configured to perform:
a matching process based on a correlation for an image block on the basis of a disparity search range for each image block estimated and divided for the previous disparity image in two images provided from the left camera and the right camera, and outputs a disparity image for the current stereo image; and generating a disparity histogram configured with the number of pixels for each disparity value with respect to the disparity image output from the matching process, dividing the disparity image into multi-level blocks on the basis of the number of valid disparity values obtained by masking valid disparity values having the number of pixels equal to or more than a threshold value in the disparity histogram, estimating a disparity search range to include a valid disparity value for each divided image block, and providing the disparity search range; wherein the circuitry further comprises:
a disparity histogram generating module which generates a disparity histogram configured with the number of pixels for each disparity with respect to an input image, a threshold value calculating module which calculates a threshold value to have a smaller value as the number of division times is increased for the image block, an image blocking module which masks valid disparity values equal to or more than the threshold value in the image block, divides the image block when the number of masked valid disparity values is equal to or more than a predetermined ratio of the maximum disparity search value, and performs a blocking process, and a disparity search range estimating module which estimates a disparity search range for each image block on the basis of pixel information corresponding to the valid disparity value for each image block divided in multi-level for one disparity image.

2. The stereo image matching device according to claim 1, wherein the circuitry additionally calculates a valid disparity value by comparing a preset threshold value with the number of pixels calculated by applying a disparity value to a stretch function, and estimates a disparity search range including the additionally calculated valid disparity value and the masked valid disparity values for the image block, $$y = \left(\frac{x-a}{b-a}\right)^\gamma (d-c) + c \ ...$$

where γ denotes a constant set by a user, x denotes a disparity value, y denotes the number of pixels with a disparity of x, a denotes an x axis minimum value of a stretch function generated by γ, b denotes an x axis maximum value of a function generated by γ, c denotes a y axis minimum value of a stretch function generated by γ, and d denotes a y axis maximum value of a stretch function generated by γ.

3. The stereo image matching device according to claim 2, wherein the circuitry primarily calculates a valid disparity value using a stretch function for the first γ set by a user, calculates the second γ having an average value of "1" with the first γ, secondarily calculates a valid disparity value using a stretch function for the second γ, and estimates a disparity search range including the valid disparity value for the first γ and the valid disparity value for the second γ.

4. The stereo image matching device according to claim 1, wherein the threshold value calculating module calculates a threshold value for the image block using the following equation, $$\text{threshold} = \frac{\max(\text{hist}) \times \alpha}{\beta}$$

where max(hist) denotes the maximum number of pixels of the number of pixels corresponding to a disparity value, α denotes a threshold value ratio in the range of 0<α<1, and β denotes the number of divided image blocks (the number of current division times).

5. A method for estimating a disparity search range, to which multi-level disparity image division is applied, to be applied left and right image matching for the next frame using a matching-processed disparity image for left and right images provided from a left camera and a right camera, comprising:
a first step of analyzing a disparity image for left and right images and generating a disparity histogram configured with the number of pixels for each disparity value;
a second step of masking valid disparity values having the number of pixels equal to or more than a threshold value in the disparity histogram;
a third step of performing a block process of dividing an image block when the number of masked valid disparity values is equal to or more than a predetermined ratio of a maximum disparity value;
a fourth step of generating a disparity histogram for each image block divided in the third step, masking valid disparity values having the number of pixels equal to or more than a threshold value, and repeatedly performing the third step on the basis of the number of masked valid disparity values; and
a fifth step of generating, when the number of masked valid disparity values is less than a predetermined ratio of a maximum disparity search value in the third step, a disparity search range for each image block to include the valid disparity values for each image block divided for the disparity image.

6. The method as claimed in claim 5, wherein the second step comprises a step of calculating a threshold value to have a smaller value as the number of division times is increased.

7. The method as claimed in claim 6, wherein the step of calculating the threshold value calculates a threshold value for the image block using the following equation, $$\text{threshold} = \frac{\max(\text{hist}) \times \alpha}{\beta}$$

where max(hist) denotes the maximum number of pixels of the number of pixels corresponding to a disparity value, α denotes a threshold value ratio in the range of 0<α<1, and β denotes the number of divided image blocks (the number of current division times).

8. The method as claimed in claim 5, wherein the corresponding image block divides into the preset number of divided image blocks in the third step, when the number of masked valid disparity values is equal to or more than a value of dividing the maximum disparity value by the preset number of divided image blocks.

9. The method as claimed in claim 8, wherein, in the third step, the corresponding image block is divided into four image blocks to be blocked.

10. The method as claimed in claim 5, wherein, in the third step, it compares the current number of division times with the preset maximum number of division times and the blocking process for the image blocking is ended when the current number of division times is equal to or more than the maximum number of division times.

11. The method as claimed in claim 5, wherein, in the fifth step, it calculates a valid disparity value by comparing a preset threshold value with the number of pixels calculated by applying a disparity value to a stretch function, and estimates a disparity search range including the additionally calculated valid disparity value and the masked valid disparity values for the image block, $$y = \left(\frac{x-a}{b-a}\right)^{\gamma}(d-c) + c$$

where $\gamma$ denotes a constant set by a user, x denotes a disparity value, y denotes the number of pixels with a disparity of x, a denotes an x axis minimum value of a stretch function generated by $\gamma$, b denotes an x axis maximum value of a function generated by $\gamma$, c denotes a y axis minimum value of a stretch function generated by $\gamma$, and d denotes a y axis maximum value of a stretch function generated by $\gamma$.

12. The method as claimed in claim 11, wherein, in the fifth step, it additionally generates a disparity histogram for the image block based on the number of pixels calculated by applying a disparity value to the stretch function and additionally calculates disparity values having the number of pixels equal to or more than a preset threshold value as a valid disparity value for the additionally generated disparity histogram.

13. The method as claimed in claim 11, wherein, in the fifth step, it primarily calculates a valid disparity value using a stretch function for the first $\gamma$ set by a user, calculates the second $\gamma$ having an average value of "1" with the first $\gamma$, secondarily calculates a valid disparity value using a stretch function for the second $\gamma$, and estimates a disparity search range including the valid disparity value for the first $\gamma$ and the valid disparity value for the second $\gamma$.

* * * * *